Patented May 4, 1937

2,078,922

UNITED STATES PATENT OFFICE 2,078,922

SYNTHESIS OF HIGHER AMINES

Herrick R. Arnold, Elmhurst, Del., assignor to E. I. du Pont de Nemours & Company, Wilmington, Del., a corporation of Delaware No Drawing. Application June 28, 1934, Serial No. 732,836

11 Claims. (Cl. 260—127)

This invention relates to the catalytic synthesis of amines from alcohols and ammonia, and more particularly to the formation of the higher amines, that is, the amines of more than four carbon atoms by the catalytic synthesis of these amines in the vapor phase.

This case is a continuation in part of United States application Serial Number 478,317, filed August 27, 1930 and issued March 5, 1935 as U. S. Patent No. 1,992,935.

This invention has as an object a process for the catalytic amination of aliphatic alcohols containing more than four carbon atoms. A further object is the use in this process of catalysts consisting of dehydrating metal oxides and salts, and more particularly the use of said dehydrating oxides supported on rigid, porous supports such as silica gel, or activated carbon. Other objects will appear hereinafter.

These objects are accomplished by the following invention. It has been found that if a higher alcohol, one containing more than four carbon atoms, is vaporized, the vapor admixed with ammonia and passed over an amination catalyst, that amines of the said higher alcohols will be formed.

The following examples are illustrative of the invention but are not to be considered as limiting the scope thereof:

Example I

A catalyst consisting of silica gel impregnated with aluminum oxide was prepared in the following manner: 290 grams of a commercial silica gel was evacuated for four hours at 400° C. After cooling down in vacuo the gel was immersed in a solution of 140 grams of aluminum nitrate in 700 cc. of water. After standing several hours, the excess liquid was filtered off and the impregnated gel was dried and ignited at 400° C. to decompose the aluminum nitrate contained in the pores of the gel.

Dodecyl alcohol was vaporized at the rate of 0.223 mol. per hour, mixed with anhydrous ammonia in the mol. ratio of 1 to 2.3, and passed continuously over 27 cc. of the catalyst at 300° C. and atmospheric pressure. Under these conditions the gas space velocity was 1350 cc./cc. catalyst/hour, equivalent to a time of contact of 2.82 seconds. The conversion of dodecyl alcohol obtained was 6.6% to monododecylamine, 5.5% to didodecylamine, and less than 0.5% to tridodecylamine.

Example II

The experiment performed in Example I was repeated with the exception that the temperature was increased to 350° C., 7.5% of monododecylamine, 23.5% of didodecylamine, and 8.0% tridodecylamine was obtained, representing a total conversion of alcohol to amine of about 39%.

Example III

Octadecyl alcohol, vaporized at the rate of 0.145 mol. per hour and mixed with ammonia in the mol. ratio of 1 to 3.4 was passed at atmospheric pressure and a temperature of 360° C. over the 40 cc. of catalyst described in Example I. This gave a gas space velocity of 830 cc./cc. catalyst/hour equivalent to a time of contact of 5.68 seconds. Fifty-four percent of the octadecyl alcohol was converted to a mixture of mono-, di-, and trioctadecylamines.

Example IV

Oleyl alcohol was caused to react with ammonia over the same catalyst under the same conditions as described in Example III. Approximately 30% of the alcohol was converted to a mixture of mono-, di-, and trioleylamines.

Example V

A catalyst consisting of alumina supported on activated charcoal was made by the method described in Example I. Two hundred fifty cc. of the charcoal screened to 6–14 mesh and weighing 107 g. was impregnated with 250 cc. of a solution made by dissolving 200 g. of crystalline aluminum nitrate in one liter of water. After filtering, drying, and igniting the impregnated charcoal it was reimpregnated with aluminum nitrate solution in exactly the same manner and ignited.

Octyl alcohol was vaporized at the rate of 0.299 mol. per hour, mixed with anhydrous ammonia in the mol. ratio 1 to 2.4 was passed over 40 cc. of this catalyst at atmospheric pressure, 350° C., and a gas space velocity of 1300 cc. gas/cc. catalyst per hour, equivalent to a time of contact of 2.82 seconds. Thirty-six percent of the octyl alcohol was converted to a mixture of mono-, di-, and trioctylamines.

Example VI

A mixture of primary alcohols prepared by the hydrogenation of carbon monoxide under pressure, consisting chiefly of 2-methyl-pentanol-1, and boiling between 145.8° and 148.4° C. was vaporized at the rate of 0.353 mol./hour and mixed with ammonia in the mol. ratio of 1 to 2 and passed over 40 cc. of the catalyst described in Example I above, at atmospheric pressure, and a temperature of 350° C. At a gas space velocity of 1350 cc. mixed vapors/cc. catalyst/hour equivalent to a time of contact of 2.66 seconds, 29% of the alcohols were converted to amines.

*Example VII*

Decamethylene glycol was vaporized at the rate of 0.353 mol./hour and mixed with ammonia in the mol. ratio of 1:4 and passed over 40 cc. of the catalyst described in Example I above, at atmospheric pressure, and at a temperature of 350° C. The corresponding diamine was formed.

The process disclosed above can be used for the production of amines from aliphatic alcohols containing more than four carbon atoms, and especially from the aliphatic alcohols having up to at least 18 carbon atoms. These alcohols may be either primary, secondary or tertiary aliphatic alcohols. Mixed amines may be also formed from mixtures of the above alcohol or from the alcohols of more than five carbon atoms obtained from the catalytic hydrogenation of carbon oxides under elevated temperature and pressure.

The process disclosed above may be modified so as to control the relative quantities of primary, secondary, or tertiary amines produced in any given case by recovering and recirculating the undesired amine or amines together with fresh alcohol and ammonia over the catalyst according to the procedure disclosed in U. S. Patent 1,799,722, in order to inhibit further formation of the undesired amines and to increase the yield of the desired amine. For example, in synthesizing dodecylamines as described in Example II above, didodecylamines may be produced to the practical exclusion of mono- and tri-amines by recirculating the latter together with fresh alcohol and ammonia, over the catalyst under the conditions specified.

Any dehydrating metal oxide or mixture of oxides such as alumina, thoria, or the oxide of tungsten, metallic salts such as sulfates or phosphates, silica gel, and zeolites may be used for carrying out the synthesis of higher amines. A catalyst made in the following manner may be used in this process. Two hundred and forty grams of sodium carbonate, dissolved in 2500 cc. of water, is added with stirring to such an amount of alum liquor having a specific gravity of 1.06 as contains 80 grams of alumina. The precipitate is allowed to settle and is washed by decantation, filtered and dried. It is then granulated for use as a catalyst in a vapor phase process. Such a catalyst when used under the conditions described in Example II will give substantial yields of mono-, di-, and trilauryl amines.

I prefer, however, to use catalysts prepared by impregnating porous, rigid supports with the dehydrating oxide or mixtures of oxides. The preparation of these supported catalysts need not be limited to the particular method described in the above examples. For instance, instead of previously evacuating the supporting material, it may be merely soaked in a solution of suitable concentration of a salt of the metal selected as the catalytic component, before drying and igniting the salt to the metal oxide. Any salt, such as the carbonate or the nitrate, which is capable of being decomposed by heat to the desired oxide, may be used for impregnating the porous support. Any rigid, porous, material such as alumina gel, Indianaite, doucil, or any base-exchange silicate may be used as the catalyst support but I prefer to use either silica gel, or activated carbon.

The temperature limits between which the process may be operated are from 250° to 500° C., although the preferred range is about 300–400° C. The mol. ratio of alcohol to ammonia may vary from 1 to 0.25, to as high as 1 to 10, while the time of contact may vary from less than one second to as high as 20 seconds. Ordinarily, however, it is desirable to operate at a ratio of 1 to 3, and a time of contact of 2–8 seconds.

I prefer to operate at atmospheric pressure, however pressures above atmospheric may be used but to little advantage.

As many apparently widely different embodiments of this invention may be made without departing from the spirit and scope thereof, it is to be understood that I do not limit myself to the specific embodiments thereof except as defined in the appended patent claims.

I claim:

1. A process of making amines of more than 4 carbon atoms which comprises passing a mixture of ammonia and the vapors of an aliphatic alcohol containing from 5 to 18 carbon atoms at substantially atmospheric pressure over a catalyst comprising essentially a rigid porous gel impregnated with aluminum oxide at a temperature between 250–500° C.

2. The process of claim 1 in which a temperature is maintained between 300–400° C.

3. The process of claim 1 in which the aliphatic alcohol is dodecyl alcohol.

4. The process of claim 1 in which the aliphatic alcohol is octadecyl alcohol.

5. The process of claim 1 in which the aliphatic alcohol is 2-methyl-pentanol-1.

6. A process of making amines of more than four carbon atoms, which comprises passing the vapors of an aliphatic alcohol containing from 5 to 18 carbon atoms, while admixed with ammonia in the molecular proportions of alcohol to ammonia of between 1:0.25 to 1:10, at substantially atmospheric pressure over a catalyst comprising essentially a rigid porous gel impregnated with aluminum oxide, said catalyst being heated to a temperature between 250° and 500° C.

7. The process of claim 6 in which the molecular proportions are about 1:3.

8. A process which comprises vaporizing dodecyl alcohol, admixing the vapor with ammonia in proportions of about 1 mol. of alcohol to 2½ mols of ammonia, passing the mixed vapors at a space velocity of about 1350 cc. per cc. of catalyst per hour and at substantially atmospheric pressure over a catalyst comprising essentially silica gel impregnated with aluminum oxide, said catalyst being heated to about 350° C.

9. A process which comprises vaporizing octadecyl alcohol, admixing the vapor with ammonia in proportions of about 1 mol. alcohol to 3.4 mols of ammonia, passing the mixed vapor at substantially atmospheric pressure over a catalyst comprising essentially silica gel impregnated with aluminum oxide, said catalyst being heated to a temperature of about 360° C.

10. The process of making amines which comprises passing at substantially atmospheric pressure a mixture of ammonia and the vapors of a mixture of branched carbon open chain alcohols containing chiefly 2-methyl-pentanol-1 over a catalyst comprising essentially a rigid porous gel impregnated with aluminum oxide at a temperature between 250° and 500° C., said alcohols being obtainable by the catalytic hydrogenation of a carbon oxide.

11. The process of making amines which comprises passing at substantially atmospheric pressure a mixture of ammonia and the vapors of alcohols, consisting chiefly of 2-methyl-pentanol-1, boiling between 145.8 to 148.4° C. at normal pressure and obtained from the catalytic hydrogenation of a carbon oxide, over a catalyst comprising essentially silica gel impregnated with aluminum oxide, said catalyst being heated to a temperature of 350° C.

HERRICK R. ARNOLD.